Patented Apr. 13, 1954

2,675,365

UNITED STATES PATENT OFFICE 2,675,365

PIPE JOINTING COMPOSITION

Raymond B. Seymour, Allentown, and Walter R. Pascoe, Reading, Pa., assignors to The Atlas Mineral Products Company of Pennsylvania, Mertztown, Pa., a corporation of Pennsylvania No Drawing. Application February 3, 1951, Serial No. 209,322

2 Claims. (Cl. 260—41)

This invention relates to a fusible resinous composition especially adapted for use in the jointing of clay sewer pipes, cement concrete sewer pipes, cast iron pipes and the like.

Experience of many years has demonstrated the permanence of vitrified clay pipe for sewers but permanent piping with poor joints does not provide a satisfactory sewer system. Joints that are satisfactory must be water-tight and corrosion resistant. To assure such joints, careful consideration must be given to the material to be used as the jointing compound. A perfect jointing compound should form a strong permanent bond, should be dense, chemically inert, flexible, quicksetting, resistant to pressure, easy to use and inexpensive. In the past, cement joints have been used but they are too rigid, allow the infiltration of water, allow root penetration and are difficult to form. Asphaltic joints have been made using troweling compositions as well as hot-poured joints based on coal tar and sulfur compositions. However, experience has shown that asphaltic compositions do not resist root growth, sulfur compositions are attacked by sulfur bacteria and coal tar compositions have extremely poor adhesion.

The object of this invention is to provide a fusible resinous composition which forms a strong permanent bond and is dense, chemically inert, flexible, quicksetting, resistant to pressure, easy to use and inexpensive.

By the present invention, vitrified clay sewer pipe, cement pipe, as well as cast iron pipe may be satisfactorily jointed by means of a composition comprising petroleum hydrocarbon resins, such as are obtained by cracking petroleum oils, and a properly selected mineral filler. In the selection of the petroleum resin, coal tar was considered, and while a composition containing 75–85% coal tar and 20% filler produced a fairly satisfactory joint, it lacked adhesion to vitrified clay pipe and was not satisfactory. Coumarone-indene resins similar to those described in U. S. Patent 2,259,761 were considered, but such compositions were destroyed by sodium hypochlorite, sodium hydroxide and dilute sulfuric acid. All these materials are normally present in both domestic and industrial waste lines and, therefore, would destroy a pipe joint based on such compositions. The only suitable resin was a non-reactive, thermoplastic hydrocarbon type resin derived through polymerization of residues of unsaturated products obtained from the cracking of petroleum oils. These resins are highly resistant to moisture, acids, alcohols, oil, grease and alkali. In spite of being entirely hydrocarbon, they are not readily flammable. They will burn but do not support combustion and therefore are ideally suited for the compositions described. Attempts to make a pipe jointing material by melting these materials were unsatisfactory in spite of many investigations. The resins themselves are very brittle and give poor adhesion. Because of the method of forming these resins through polymerization of cracked fractions, they cannot be described except as non-reactive thermoplastic hydrocarbon resins, having a melting range as determined by the cube in mercury method of 65–125° C. and a specific gravity of 1.05–1.22. These resins are sometimes sold under the trade name "Resinex."

In compounding a proper admixture, the addition of graded silica aggregate with small amounts of slate flour or carbon provides a product having outstanding adhesion and sufficient flexibility so that the resulting body meets all the requirements of a perfect jointing composition.

The proportion of hydrocarbon resin can be varied from 30–70% by weight of the composition and still retain desirable properties. Compositions having less than 30% resin by weight will not flow when melted and those containing over 70% are too brittle and lack adhesion. It is advantageous to have the aggregate made up of 2½–25% carbon or slate flour ground to 325 mesh. The addition of finely divided carbon or slate flour is essential in order to get good suspension and non-settling of the ingredients during melting. However, when the filler is made up of more than 25% carbon or slate flour, the mass is much too thick and satisfactory joints cannot be obtained.

The completed composition is obtained by compounding a mixture containing from 30–70 parts by weight of a non-reactive thermoplastic hydrocarbon resin derived through the polymerization of cracked petroleum oils and having a melting point of 65–125° C. and specific gravity at 25° C. of 1.05–1.22 and 70–30 parts of a graded aggregate containing 75–97.5% silica and 2.5–25% finely divided carbon or slate flour. The silica aggregate employed is a graded aggregate, having the following screen analysis: 15% by weight, 80–100 mesh; 15% by weight, 100–150 mesh; 15% by weight, 150–200 mesh; 55% by weight, 200 mesh or finer. In some instances it is also advantageous to use up to 25 parts of extremely fine silica or "moon" silica, which is silica ground to 325 mesh.

The following examples will be further illustrative of the invention:

Example 1

A joint was made by melting together 42.5 parts of a thermoplastic hydrocarbon resin having a melting point of 95° C. and a specific gravity of 1.13 with five parts of finely divided slate powder and 53.5 parts of a graded silica aggregate. This composition flowed freely at 400° F. and no chemical action took place when the joint was immersed for five days in 5% sulfuric acid, 5% sodium hydroxide, 5% potassium hydroxide, 5% sodium hypochlorite or water saturated with hydrogen sulfide. The product has a softening point of 215° F., A. S. T. M. D–36–26, and a penetration at 77° F. of O, A. S. T. M. D–5–25. This product had a tensile strength of 500 p. s. i., and an adhesion to glazed vitrified clay pipe of 200 p. s. i. In addition, the product had a bonding strength of 250 p. s. i. when a joint of ½ inch thickness was poured between asphalt primed vitrified unglazed clay pipe surface and soaked for 24 hours at room temperature. The product had no absorption when immersed in water for 24 hours. It had a penetration of 1.5 mm. after 4 hours with a 2000 gram load, A. S. T. M. D–5–47T, using an untapered needle with a diameter of 2 mm. In spite of the brittleness of the hydrocarbon resin, the pipe joint could be readily deflected through an angle of 10° without the jointing material cracking, checking or breaking away from the surface of the pipe. The pipe joints did not leak when subjected to an internal hydrostatic pressure of 10 p. s. i. for a period of five minutes. In addition, when a cylinder 0.875 inch in diameter and 2 inches in height was placed on end and maintained at 90° F. for 10 hours, it slumped less than $\frac{1}{32}$ of an inch.

Example 2

Example 1 was repeated using finely divided carbon in place of slate flour.

Example 3

Example 1 was repeated using 45 parts of a thermoplastic hydrocarbon resin having a melting point of 120° C. and a specific gravity at 25° C. of 1.163. In this example, the total aggregate was 55 parts by weight.

Example 4

Example 3 was repeated using 38 parts of a thermoplastic hydrocarbon resin having a melting point of 70° C. and a specific gravity of 1.124 along with 62 parts of the previously described aggregate.

The following two examples are included to illustrate the superiority of the improved pipe joint over conventional pipe joints of the same type.

Example 5

To 80 parts of a 220° F. melting point coal tar was added 20 parts of graded silica aggregate and the composition was poured hot to form a joint in the customary manner using vitrified clay pipe. This product had low penetration indicating root resistance but had adhesion of less than 30 pounds per square inch to the pipe and therefore did not make a satisfactory joint.

Example 6

A similar joint was made from a composition obtained by melting one part of a coumarone-indene resin having a melting point of 100–125° F., 2½ parts of graded silica aggregate, 0.1 part dibutyl phthalate and 0.036 part of cupric oleate. The joint formed from this composition had poor adhesion and the joint disintegrated when immersed for two weeks in 5% sodium hypochlorite.

In addition pots were prepared from 6 inch lengths of unglazed four inch vitrified clay pipe stock and a melted composition was poured in the bottom ¼ inch thick in order to form a container. A eucalyptus seedling was planted in soil inside the pot and the pot set in a sand box, jacketed on sides and bottom with circulating water at 80° F. When this test was conducted with ordinary asphaltic compounds or concrete, the roots penetrated to the bottom of the pot in less than two months. However, after eight months, there was no indication of any penetration by the roots when using the composition of Example 1.

The scope of the invention is to be restricted only in accordance with the appended claims.

What is claimed is:

1. A sealing composition comprising 30–70 parts by weight of a thermoplastic hydrocarbon resin derived from the polymerization of cracked petroleum oils and having a melting point of 65–125° C. and a specific gravity of 1.05–1.22 at 25° C., and 70–30 parts by weight of an aggregate comprising 75–97.5% silica and 2.5–25% of a material selected from the group consisting of finely divided carbon and slate flour, a major proportion of said silica being finer than 200 mesh and all of said silica being finer than 80 mesh.

2. A sealing composition comprising about 42.5 parts by weight of a thermoplastic hydrocarbon resin derived from the polymerization of cracked petroleum oils and having a melting point of 95° C. and a specific gravity of about 1.13, about 53.5 parts by weight of silica aggregate and about 5 parts by weight of slate flour, a major proportion of said silica aggregate being finer than 200 mesh and all of said silica aggregate being finer than 80 mesh.

References Cited in the file of this patent

UNITED STATES PATENTS

| Number | Name | Date |
|---|---|---|
| 2,390,189 | Soday | Dec. 4, 1945 |
| 2,418,135 | Moore et al. | Apr. 1, 1947 |